United States Patent [19]

Maegawa et al.

[11] Patent Number: 4,485,415
[45] Date of Patent: Nov. 27, 1984

[54] METHOD FOR RECORDING DIGITAL INFORMATION

[75] Inventors: Toshiyuki Maegawa, Hiyashiosaka; Haruo Nakatsuji, Ikoma, both of Japan

[73] Assignee: Sharp Kabushiki Kaisha, Osaka, Japan

[21] Appl. No.: 504,863

[22] Filed: Jun. 16, 1983

Related U.S. Application Data

[63] Continuation of Ser. No. 256,532, Apr. 22, 1981.

[30] Foreign Application Priority Data

Apr. 23, 1980 [JP] Japan .................................. 55-54744

[51] Int. Cl.³ .......................... G11B 5/09; G11B 5/02
[52] U.S. Cl. ........................................ 360/46; 360/67
[58] Field of Search .................... 360/40, 46, 48, 67

[56] References Cited

U.S. PATENT DOCUMENTS

| | | | |
|---|---|---|---|
| 3,439,344 | 4/1969 | Stanga | 360/48 |
| 4,081,844 | 3/1978 | Devore et al. | 360/48 |
| 4,201,980 | 5/1980 | Friedman et al. | 360/40 |
| 4,202,016 | 5/1980 | Sampey | 360/46 |

Primary Examiner—Vincent P. Canney
Attorney, Agent, or Firm—Birch, Stewart, Kolasch & Birch

[57] ABSTRACT

A method for recording digital information on a recording medium immediately after a silence interval is disclosed. A signal sound of a predetermined level is recorded at the beginning of the digital information stored on the recording medium. Preferably, a silence interval is placed between the signal sound of the predetermined level and the beginning of the digital information.

5 Claims, 9 Drawing Figures

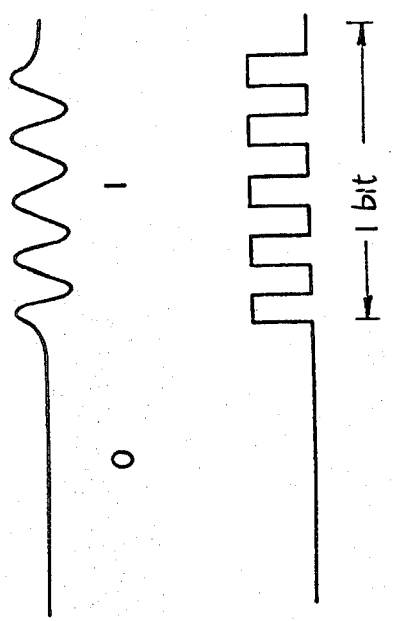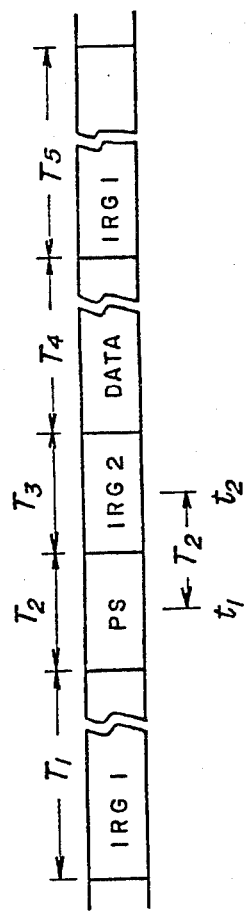

METHOD FOR RECORDING DIGITAL INFORMATION

This application is a continuation of application Ser. No. 256,532 filed on Apr. 22, 1981.

BACKGROUND OF THE INVENTION

This invention relates to a method for recording digital information such as program data necessary for information processing and alphanumerical data to be processed. More particularly, the present invention relates to a method for recording digital information on a recording medium for use in an audio equipment such as an audio cassette tape recorder.

With the widespread use of programmable calculators and personal computers, audio cassette tapes have been widely used as a device for recording programs and data. The reason why the audio cassette tapes are used for recording purposes is that they are one of the cheaper and more easily available recording meduims.

However, a variety of problems come up in recording digital information on a recording meduim designed for audio applications. For example, a recording level adjusting circuit incorporated into a tape recorder or other audio equipment, gives rise to error in reading out digital information. In other words, the conventional audio cassette tape recorder has such a recording level adjusting circuit which manifests a high amplification factor for low sounds and a low amplification factor for loud sound.

The adjusting circuit is of a design suited for recording sound signals (in its broadest aspect) and not for recording digital information. Readout error would be caused especially for the tone burse method as mentioned below.

Ways to record digital information on a recording medium for audio applications can be classified into two categories as follows:

(i) two frequency method
(ii) tone burst method.

The former method (i) is a so-called FM modulation method by which a logic level "1" is represented by $f_1$ and a logic level "0" by $f_2$ and recordings are modulated with those different frequencies. The latter method (ii) is a method by which one of logic levels "1" and "0" is modulated with a specific frequency and the other is held at a silent level. In either case, the number of pulses is counted for a given length of time to evaluate the pulse width and the logic level "1" or "0" is determined based upon the number or duration of the pulses.

For those methods silence as well as sound information must be recorded in the record mode where the above discussed recording level adjusting circuit works so that noise is inadvertently recorded on the position on the tape which should never bear any recording. Should the logic level "0" correspond to a non-recorded or silence portion, the logic "0" would be misread as the logic "1."

Furthermore, in the event that a definite signal is recorded immediately after such a silence interval, the leading edge signal level is greatly varied and distorted, thus leading to erroneous level determination.

OBJECTS AND SUMMARY OF THE INVENTION

Accordingly, it is an object of the present invention to provide an improved method for recording digital information which overcomes the prior art problems as discussed above.

It is another object of the present invention to provide a method for recording digital information which is useful in recording information immediately after a silence interval and applicable to both the tone burst method and the two frequency method.

It is still another object of the present invention to provide a method for recording digital information which overcomes the adverse effect of a recording level adjusting circuit as discussed previously.

To accomplish the above objects, the present invention provides a method for recording digital information on a recording medium immediately after a silence interval, comprising the step of recording a signal sound of a predetermined level at the beginning of the digital information stored on the recording medium. Preferably, a silence interval is placed between the signal sound of the predetermined level and the beginning of the digital information.

BRIEF DESCRIPTION OF THE DRAWINGS

For a more complete understanding of the present invention and for further objects and advantages thereof, reference is now made to the following description taken in conjunction with the accompanying drawings showing specific embodiments of the present invention, in which:

FIGS. 1(a) and 1(b) are views showing the relationship between logic levels and a signal;

FIG. 2 is a view showing a basic format of a recording when information is recorded;

DETAILED DESCRIPTION OF THE INVENTION

FIGS. 1(a) and 1(b) show the relationship between logic levels and an intelligence signal, wherein FIG. 1(a) depicts the state of the intelligence signal recorded or to be recorded on a tape and FIG. 1(b) depicts the waveform consisting of logic levels "1" and "0" corresponding to the signal. A logic "1" level bit is represented by 5 pulses of 5 KHz and a logic "0" level bit is represented by a low and flat level for a given length of time.

FIG. 2 shows an exemplary format used when data is to be recorded on a recording medium for audio applications. In FIG. 2, silence sections (that is, the logic "0" level) are denoted by $IRG_1$ and $IRG_2$ and $IRG_1$ is longer than $IRG_2$. A provisional recording section is denoted by PS where logic "1" signals are recorded for a time of 250 msec, for example. This is to prevent fluctuations in recording level from adversely affecting DATA sections when a recording level adjusting circuit becomes operable as stated previously. The recording level in the section $IRG_2$ is limited by the output (recording) of the section PS and held only for a very short period of time as it is.

As a general rule, the recording level adjusting circuit is slow in response are holds the recording level at unity as determined by the section PS as long as the sections $IRG_2$ is short and permits the DATA sectios to be recorded at that recording level.

Figure 3:
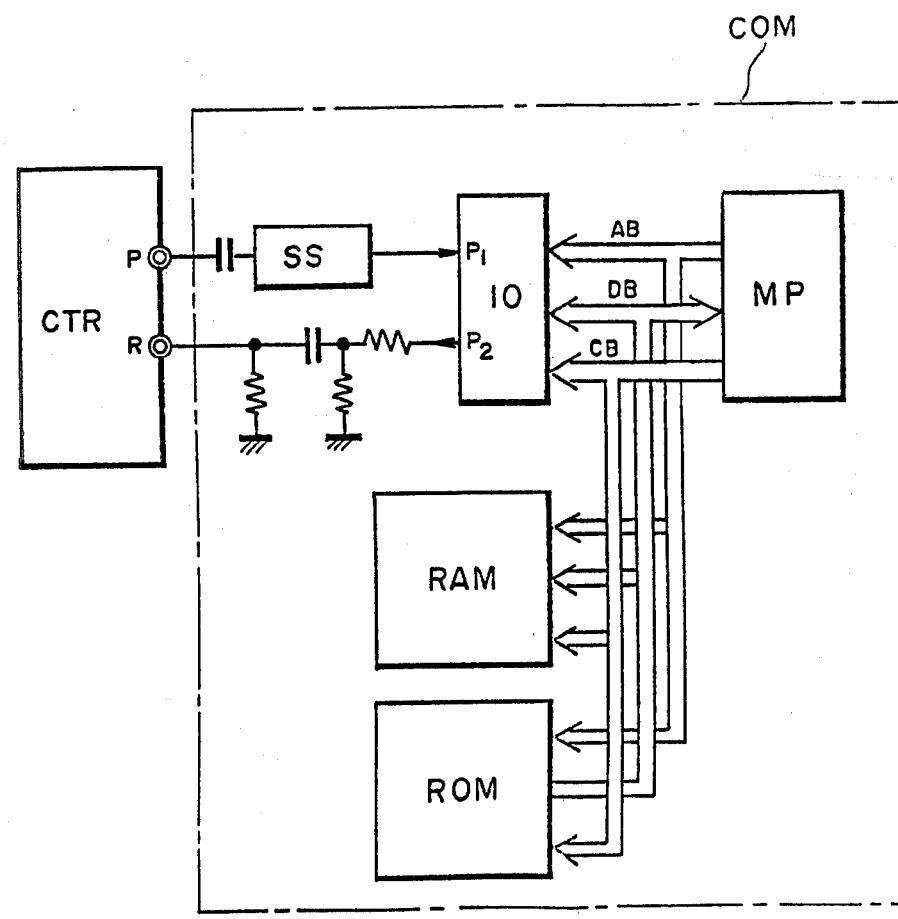
FIG. 3 is a block diagram showing the relationship between a calculator and a cassette tape recorder.

FIG. 3 shows the connection between a calculator or a computer and a cassette tape recorder, wherein the former is denoted by COM and the latter by CTR. As is well known in the art, the calculator COM includes a microprocessor MP, an input/output interface IO, a read/write memory RAM and a read only memory ROM. These components MP, IO, RAM and ROM are in communication with each other via an address bus AB, a data bus DB and a control bus CB. An output signal from a port $P_2$ of the input/output interface IO is converted to one of a predetermined level via resistors and a capacitor and delivered as a record signal for the cassette tape recorder. In the play mode of the cassette tape recorder a play signal is inputted to a port $P_1$ of the input/output interface IO via a capacitor and a Schmitt circuit SS. The Schmitt circuit is intended to remove noise for an intermediate level.

Figure 4:
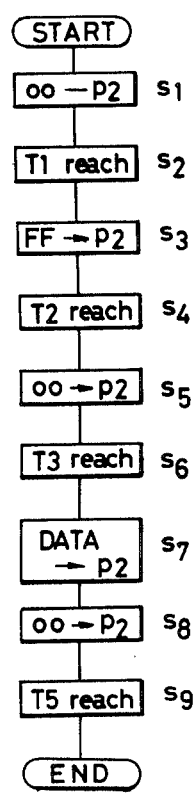
FIGS. 4 and 5 are flow charts showing the sequences for loading and reading information.

With such an arrangement, the signal as shown in FIG. 2 is recorded on the tape in the following manner. FIG. 4 is a flow chart wherein "00" (hexadecimal notation) or 8-bit all zeros are outputted to the output port $P_2$ in serial fashion. This condition lasts for a time $T_1$ (say, 14 sec) ($S_1 \rightarrow S_2$), establishing the silence interval $IRG_1$ corresponding to the time $T_1$ on the tape. Thereafter, FF (hexadecimal notation) or 8-bit all ones are outputted in serial fashion. This condition lasts for a time $T_2(S_3 \rightarrow S_4)$, thus establishing a provisional recording section of $T_2$ long. Furthermore, the silence section $IRG_2$ extending for $T_3$ is provided ($S_5 \rightarrow S_6$). The length of time $T_3$ may be equal to $T_2$ or longer than $T_2$ to an extent which does not vary the recording level due to operation of the recording level adjusting circuit.

Following the recoding of these provisional signals, intelligence signals originating from modulation on desired pieces of information are delivered from the port $P_2$ ($S_7$). After outputting the desired pieces of information is completed, another silence section $IRG_1$ which is substantially same to the first established silence section is provided ($S_8 \rightarrow S_9$). The longer and first silence section avoids the problem that a leading portion of the desired pieces of information would not be recorded when the tape runs begining with a leading portion thereof as well as distinguishing the beginning of a new recording over the previous one. The longer but last silence section is to distinguish the end of a new recording over the previous one. Moreover, the shorter silence section $IRG_2$ immediately after the provisional recording section is to distinguish the silence section over the begining of the data.

Figure 5:
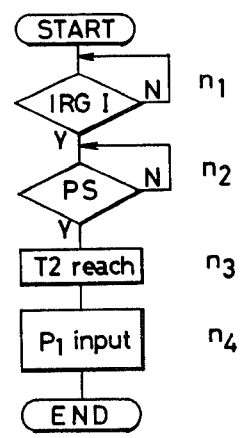

The information already recorded is read out in the following manner. FIG. 5 is a flow chart showing such procedure. It is first decided whether the signal reproduced via the tape recorder is a silience of a longer term (e.g., more than several sec) and, if so, it is decided wether it is within the provisional recording section ($n_1 \rightarrow n_2$). Both decisions are made depending upon the logic value of the input via the port $P_1$. Although the waveform is initially distorted, distortion is reduced to a minimum within the interval PS (the time $T_2$). It is $t_1$ when the true signals come as seen from FIG. 2. Once the provisional recording section has been sensed the recorder is ready to receive data inputs upon the passage of the time $t_2$ ($n_3 \rightarrow n_4$). For example, if the provisional recording section is sensed at the point in time $t_2$, then the recorder is made ready to receive the data inputs at the point in time $t_2$ which is the time $T_2$ later than the point $t_1$. In other words, the tape recorder is in standby state until the beginning of the data comes and then introduces the data and effects serial-parallel conversion or code conversion. The result of such conversion is loaded into a proper location in RAM.

Figure 6:
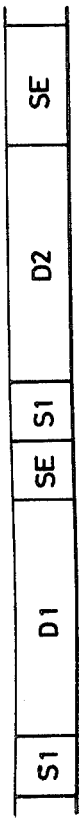
FIG. 6 is a view showing a format of a 8-bit code within data.

FIG. 6 shows a structure of an 8-bit code signal within the data, which code signal comprises a start bit SI of a logic "1" level, a stop bit SE of a logic level "0", upper 4-bit data $D_1$ and lower 4-bit data $D_2$. The stop bit which follows the data $D_2$ is 2-bits long. This structure is because of the need to store the code signal within storage upon completion of introduction of the code signal and to prevent the start bit of the next succeeding code signal from being entered until the storing operation is completed.

Furthermore, since the 8-bit code signal is split into 4-bit halves, the length of time from the start bit through the stop bit becomes shorter and the operating margin of the tape recoder against variations in the speed of travel of the tape becomes wider. Because the start bit is of logic level "1", recording is carried out on the tape at least every sixth bit even when $D_1$ and $D_2$ are all zeros. Therefore, recording is performed without rendering the recording level adjusting circuit operable and increasing remarkably the recording level.

Figure 7A:
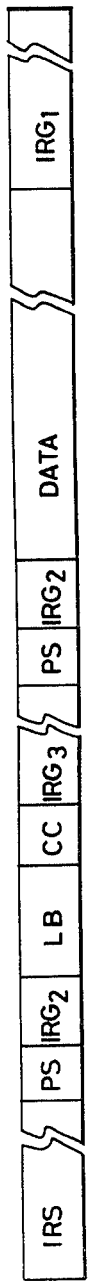
FIGS. 7(a) and 7(b) are a view showing an exemplary recording of data with labels and a view showing part of an item CC in the recording.

FIG. 7(a) shows a specific example of a recording of data with a label wherein DATA represents the data, LB represents a label bearing a title, and CC represents the kind and length of the data. $IRG_3$ is a silence section comparatively longer than $IRG_2$, aiming at preventing a leading portion of the data from being entered during the time of decision as to whether the label selected by the operator is in agreement with the label LB on the tape. The silence section $IRG_3$ is longer than the response time of the automatic recording level adjusting circuit and the provisional recording interval PS is provided at the beginning of the data.

Figure 7B:
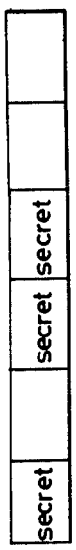

FIG. 7(b) shows part of the contents of CC in FIG. 7(a) wherein a "secret" bit represents that the following data is confidential. Provided that any of these "secret" bits is present, the data is never recorded on an external recording medium although it is capable of being loaded into the calculator. If any bit is marked "secret" by error or such bit is misread, there is little likelihood of inveiling information which is to be kept confidential.

As noted earlier, the present invention is useful in recording digital information beginning with the silence section and avoids the disadvantages due to the effect of the recording level adjusting circuit. Furthermore, provision of the silence section intermediate the sound signal with the predetermined level and the beginning of the recording of information maintains the signal sound at the recording level available from the recording and permits the digital data section to be recorded at that recording level.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of preventing erroneous readout of digital data recorded on a recording medium having a first silence section, a ones section enconded subsequently to said first silence section, a second silence section subsequent to said ones section and said digital data recorded thereon subsequent to said second silence section, in a system including a recording level adjusting circuit, comprising:

preventing an unwanted increase in recording gain by recording said ones section on said recording medium prior to recording said digital data thereon; and playing back said digital data recorded on said recording medium the prevention of unwanted increase in system gain by said ones section preventing erroneous playback of said data.

2. The method of claim 1 wherein said recording medium is magnetic tape.

3. The method of claim 2 wherein recording level adjusting circuit has a slot time for response.

4. The method of claim 2 wherein said second silence section is shorter in duration than said first silence section and at least as long as said ones signal section.

5. The method of claim 2 wherein said data is arranged in code signals including a first start bit, upper 4-bit data section, stop bit, second start bit, lower 4-bit data section, and two bit stop signal, consecutively.

* * * * *